United States Patent
Ogawara (10) Patent No.: US 9,586,317 B2
(45) Date of Patent: Mar. 7, 2017

(54) CONTROLLING METHOD OF ROBOT SYSTEM, PROGRAM, RECORDING MEDIUM, AND ROBOT SYSTEM

(71) Applicant: CANON KABUSHIKI KAISHA, Tokyo (JP)

(72) Inventor: Takayuki Ogawara, Yokohama-shi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/668,735

(22) Filed: Mar. 25, 2015

(65) Prior Publication Data
US 2015/0273692 A1  Oct. 1, 2015

(30) Foreign Application Priority Data
Mar. 31, 2014  (JP) .................................. 2014-072423

(51) Int. Cl.
B25J 9/16 (2006.01)
B25J 19/02 (2006.01)

(52) U.S. Cl.
CPC .......... *B25J 9/1692* (2013.01); *B25J 19/021* (2013.01); *G05B 2219/39039* (2013.01); *G05B 2219/39391* (2013.01); *Y10S 901/09* (2013.01)

(58) Field of Classification Search
CPC ...... B25J 9/1692; B25J 9/1697; B25J 9/1653; B25J 9/163; B25J 9/1638; B25J 9/1641;
(Continued)

(56) References Cited

U.S. PATENT DOCUMENTS

| | | | | |
|---|---|---|---|---|
| 4,967,370 A | * | 10/1990 | Stern ...................... | B25J 9/1692 700/254 |
| 2012/0239194 A1 | * | 9/2012 | Kagawa ................. | B25J 9/1692 700/254 |
| 2015/0158181 A1 | * | 6/2015 | Kawamura ............ | B25J 9/1697 700/259 |

FOREIGN PATENT DOCUMENTS

| | | |
|---|---|---|
| CN | 101200066 | 6/2008 |
| CN | 102328312 | 1/2012 |

(Continued)

OTHER PUBLICATIONS

Chinese Office Action issued May 4, 2016 during prosecution of related Chinese application No. 201510134721.6. (Whole English-language translation included).

*Primary Examiner* — Spencer Patton
(74) *Attorney, Agent, or Firm* — Fitzpatrick, Cella, Harper & Scinto (57) ABSTRACT

A controlling method of a robot system is provided with highly accurately determination of an origin offset at individual joints, even with a small number of cameras. A controlling unit 08 controls a robot 01 and a camera 04 to perform a photographing step for each of pivotal joints 021, 031 and 051 to acquire photographed data, and subsequently performs computational control. The photographing step assigns predetermined coordinate angles to multiple joints of the robot 01, respectively, to cause the joints to take predetermined positions and orientations, and subsequently causes the camera 04 to photograph a mark 03 during a process of causing the robot 01 to rotate at one of the multiple joints from the predetermined position and orientation. The computational control identifies the joint causing a rotational axis offset among the multiple joints of the robot 01, based on the photographed data acquired by trajectory acquiring control.

3 Claims, 5 Drawing Sheets (58) Field of Classification Search
CPC ...... B25J 9/1643; B25J 19/023; B25J 19/021;
G05B 2219/39391; G05B 2219/39397;
G05B 2219/40216; G05B 2219/39041;
Y10S 901/09
See application file for complete search history.

(56) References Cited

FOREIGN PATENT DOCUMENTS

| | | | | |
|---|---|---|---|---|
| CN | 102848389 | * | 1/2013 | ............. B25J 13/08 |
| CN | 103302663 | | 9/2013 | |
| EP | 1 598 156 | | 11/2005 | |
| JP | 63-288696 | | 11/1988 | |
| JP | 63-288696 A | | 11/1988 | |
| JP | 2008-33532 | | 2/2008 | |
| JP | 2011-125976 | | 6/2011 | |
| JP | 2011-125976 A | | 6/2011 | |

* cited by examiner

FIG. 5B
AFTER EXCHANGE

FIG. 5A
BEFORE EXCHANGE

CONTROLLING METHOD OF ROBOT SYSTEM, PROGRAM, RECORDING MEDIUM, AND ROBOT SYSTEM

BACKGROUND OF THE INVENTION

Field of the Invention

The present invention relates to a robot system including a multi joint robot and a camera. More specifically, the present invention relates to a method of determining a rotational axis offset of multiple joints of a multi joint robot.

Description of the Related Art

Multi joint robots in which both ends of link units are coupled by pivotal joints to allow the link units to bend have been widely used. The multi joint robots typically include torsional joints that allow some of link units to rotate in cross sections perpendicular to the longitudinal directions of the link units in torsional directions. Accordingly, the multi joint robots can perform complicated movement, such as six-axis motion or seven-axis motion, which is similar to the movement of human arms.

The multi joint robot may interfere with another object during installation, teaching or actual movement to cause an overload on a certain joint; the joint, in turn, causes an origin offset (rotational axis offset) at the joint. Actual movement in a state where the certain joint has the origin offset may possibly reduce movement accuracy, cause a jig or a workpiece to fall off, and cause an interference with another object that results in an overload.

Japanese Patent Application Laid-Open No. 563-288696 describes a robot system that includes a multi joint robot and a camera; as to the robot, a base unit and two links are coupled by two joints. Here, an end effector of the multi joint robot is provided with a mark. The mark found during actual movement is photographed by a television camera to acquire the moving trajectory of the mark. If the moving trajectory deviates, the movement of the robot system is stopped.

Japanese Patent Application Laid-Open No. 2011-125976 describes a robot system that includes a multi joint robot and a camera; as to the robot, a base unit and three links are coupled by three joints. Here, marks having specific shapes are provided at positions adjacent to the respective joints of the multi joint robot. The marks photographed by the camera are image-analyzed to measure the pivotal positions of the respective link units.

In a conventional multi joint robot, a pinhole is formed at an overlapping portion of two link units sandwiching a joint so as to allow a pin to be inserted through the pinhole in the case with no origin offset. By a manual operation that returns the respective joints to the origins and inserts the pins into the pinholes, determination is made as to whether an origin offset occurs or not for each joint individually. Evaluation of the origin offsets of many joints of the multi joint robot thus requires a skilled technician to take a long time.

The robot system in Japanese Patent Application Laid-Open No. S63-288696 can immediately detect occurrence of an origin offset of a joint by means of an offset of the moving trajectory of a mark in a photographed image. However, another manual operation is required to determine which joint causes the origin offset.

The robot system in Japanese Patent Application Laid-Open No. 2011-125976 can determine presence or absence of an origin offset at each joint through a photographed image to a certain extent. However, measurement of the origin offsets of multiple joints through one camera cannot highly accurately detect the origin offsets of the respective joints. Installation of cameras for the respective marks can increase accuracy in detecting the origin offset of each joint. However, installation of many cameras around the multi joint robot having a high degree of freedom is economically unfavorable. Furthermore, it is difficult to prepare positions where the cameras are to be installed.

SUMMARY OF THE INVENTION

The present invention has an object to provide a controlling method of a robot system that can highly accurately determine presence or absence of an origin offset at each of individual joints even with a small number of cameras.

According an aspect of the present invention, provided is a controlling method of a robot system in which a multi joint robot provided with an end effector or a font end side link unit portion with a mark and a camera capable of photographing the mark is controlled by a controlling unit, the controlling method comprising: photographing, during a pivotal movement of the multi joint robot around one of a plurality of joints from a predetermined position and orientation, the mark for at least two joints in order to acquire a photographed data; and identifying, based on the photographed data, a joint causing position or orientation offset among the plurality of joints of the multi joint robot.

According to a further aspect of the present invention, a robot system comprises a multi joint robot having an end effector or a font end side link unit with a mark, a camera capable of photographing the mark, and a controlling unit configured to control the multi joint robot and the camera, wherein, the controlling unit is configured to photograph, during a pivotal movement of the multi joint robot around one of a plurality of joints from a predetermined position and orientation, the mark using the camera for at least two joints in order to acquire a photographed data, and the controlling unit is configured to identify a joint causing position or orientation offset among the plurality of joints of the multi joint robot based on the photographed data.

Further features of the present invention will become apparent from the following description of exemplary embodiments, with reference to the attached drawings.

DESCRIPTION OF THE EMBODIMENTS

Preferred embodiments of the present invention will now be described in detail in accordance with the accompanying drawings.

Embodiment 1

Multi Joint Robot

Figure 1:
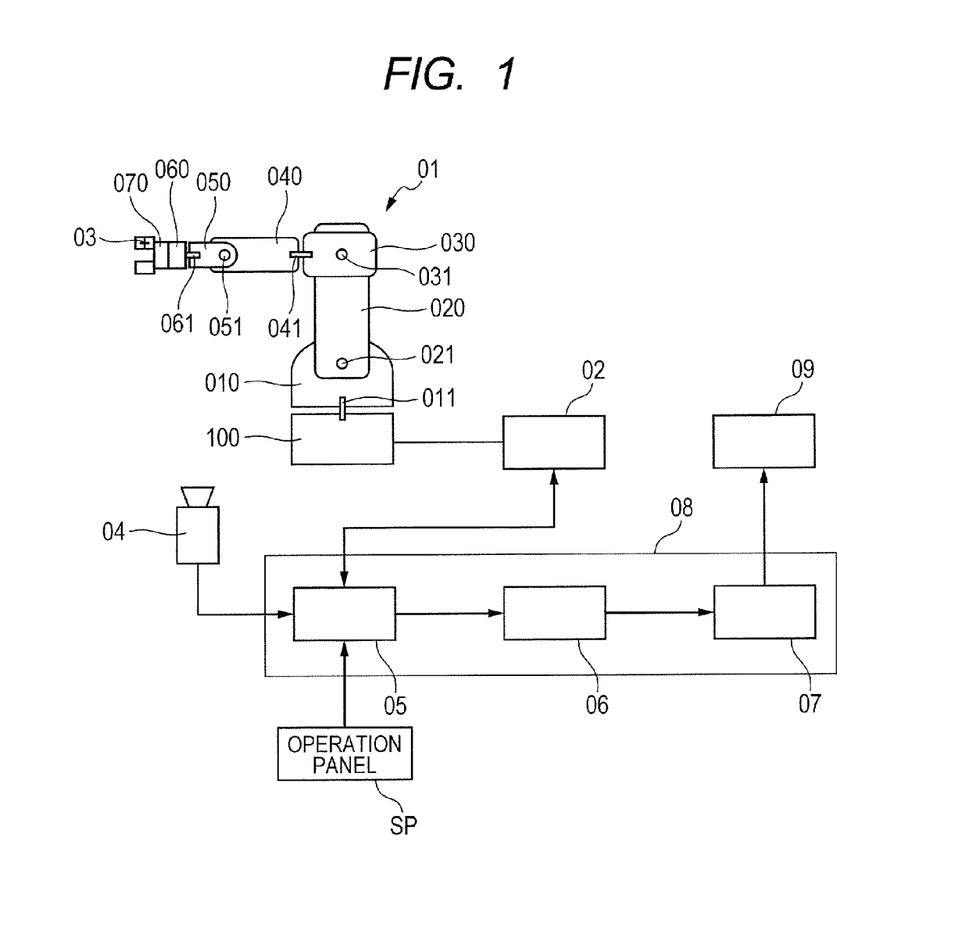
FIG. 1 is a diagram illustrating an overall configuration of a robot inspecting system of Embodiment 1.

FIG. 1 is a diagram illustrating an overall configuration of a robot inspecting system of Embodiment 1. As illustrated in FIG. 1, a robot system includes: a robot 01, which is an example of a multi joint robot; and a camera 04, which is an example of a camera. A computer of a controlling unit 08, which is an example of a controlling unit, executes a program to control this system. The program is recorded in a recording medium, such as an optical disk, and then provided.

The robot 01 is a six-axis multi joint robot that includes an end effector 070 on a link 060 at a front end. A base 100 and a link 010 of the robot 01 are coupled to each other by a torsional joint 011 that rotates around a rotational axis in the Z-axis direction. The torsional joint 011 has a movable range of ±180 degrees from an initial position and orientation.

The link 010 and a link 020 of the robot 01 are coupled to each other by a pivotal joint 021 that rotates around a rotational axis in the Y-axis direction. The pivotal joint 021 has a movable range of ±80 degrees from an initial position and orientation. The link 020 and a link 030 of the robot 01 are coupled to each other by a pivotal joint 031 that rotates around a rotational axis in the Y-axis direction. The pivotal joint 031 has a movable range of ±70 degrees from an initial position and orientation.

The link 030 and a link 040 of the robot 01 are coupled to each other by a torsional joint 041 that rotates around a rotational axis in the X-axis direction. The torsional joint 041 has a movable range of ±180 degrees from an initial position and orientation. The link 040 and a link 050 of the robot 01 are coupled to each other by a pivotal joint 051 that rotates around a rotational axis in the Y-axis direction. The pivotal joint 051 has a movable range of ±120 degrees from an initial position and orientation.

The link 050 and a link 060 of the robot 01 are coupled to each other by a torsional joint 061 that rotates around a rotational axis in the X-axis direction. The torsional joint 061 has a movable range of ±240 degrees from an initial position and orientation. An end effector 070, such as an electric hand or an air hand, for an assembling operation or a movement operation in a production line is coupled to a front end of the link 060 of the robot 01.

The robot 01 performs a predetermined movement through control by a controller 02.

As described above, the pivotal joints 021, 031 and 051 link-rotate adjacent link units. Each of the torsional joints 011, 041 and 061 torsional rotates one pivotal joint side of one link unit against another pivotal joint side. The base units (100, 010) and the first link unit (020) are coupled to each other by the first joint (021). The first link unit (020) and the second link units (030, 040) are coupled to each other by the second joint (031). The second link units (030, 040) and the third link units (050, 060) are coupled to each other by the third joint (051).

(Origin Offset of Multi Joint Robot)

Typically, a multi joint robot is used for assembling operation and conveying operation for products on a production line. The following scenarios can be assumed as the cases of occurrence of reduction in accuracy of a multi joint robot used on a production line.

(1) When a teaching operation (teaching) that teaches operations to the multi joint robot during installation of the production line is performed, an operator moves the multi joint robot using a controller. At this time, the multi joint robot contacts with a peripheral apparatus due to human error.

(2) Movement of the multi joint robot in corporation with the peripheral apparatus therearound after completion of the teaching operation, which teaches movement to the multi joint robot, causes the multi joint robot to contact with the peripheral apparatus.

(3) A momentary impact load due to movement or stopping movement of the multi joint robot, and a steady load due to continuous operation reduce accuracy, which is a durability problem caused by continuous movement of the multi joint robot.

As to the robot 01 illustrated in FIG. 1, occurrence of the reduction in accuracy (1), (2) and (3) causes large moments at the pivotal joints, which are the pivotal joint 021, the pivotal joint 031 and the pivotal joint 051; the moments are apt to cause a rotational axis offset. As to the robot 01, the reduction in accuracy (1), (2) and (3) sometimes causes jumping in speed reducers or belt and pulley drive systems for transmitting the rotation of motors that are provided in the pivotal joints 021, 031 and 051. Furthermore, the reduction sometimes causes offsets of engagement surfaces of structural members bolted at the pivotal joints 021, 031 and 051.

Such jumping and offsets of engagement surfaces vary the positional relationship between two link units arranged so as to sandwich the pivotal joints 021, 031 and 051 of the robot 01 from the original positional relationship, thereby causing origin offsets of the pivotal joints 021, 031 and 051. If at least one of pivotal joints 021, 031 and 051 causes an origin offset, the movement position of the end effector 070 attached to the front end of the robot 01 moves from the original state. Accordingly, an assembling movement or a conveying operation performed by the robot 01 cannot be highly accurately reproduced.

Thus, the robot system including the robot 01 requires periodical evaluation of variation in the origin points of the pivotal joints 021, 031 and 051. There is a need for detecting abnormality of the rotational axis offsets in the individual pivotal joints 021, 031 and 051 based on the evaluation.

In the robot system including the robot 01, the end effector 070, which is an example of an end effector or a front end side link unit, is thus provided with a mark 03. The camera 04 can photograph the moving trajectory of the mark 03. The controlling unit 08 causes the camera 04 to automatically photograph the movable mark 03, and automatically determines presence or absence of an origin offset in each of the pivotal joints 021, 031 and 051 based on photographed data.

(Mark)

As illustrated in FIG. 1, the mark 03 is for allowing the camera 04 to easily recognize the moving trajectory of the end effector 070 during movement of the robot 01. The shape and accuracy of the mark 03 are required to be appropriately selected according to recognition accuracy required for the camera 04.

Here, the mark 03 is made of grooves that have a width of 0.3 mm and a length of 20 mm and crossed each other at a right angle in the center thereof. The grooves are painted white while a peripheral area is pained black, thereby securing imaging contrast.

In order to secure resolution, a desirable mark is small and has high contrast against the background. The mark may be a bright spot of an LED or a laser diode. A configuration may be adopted where multiple marks are arranged in the angle of view of the camera 04 and an overall position of the marks can be identified as the average value of the marks.

(Camera)

As illustrated in FIG. 1, the camera 04 is added to the robot 01, and photographs the position and orientation and the state of a component grabbed by the end effector 070 during a typical assembling operation. The camera 04 can photograph the mark 03.

The camera 04 is arranged at a position that allows detecting reduction in accuracy of the joint assumed based on the configuration of the robot 01. The camera 04 recognizes the robot 01 in the Y-axis direction with respect to the robot 01, and can photograph the trajectory of the mark 03 moving in an XZ-plane.

At present, the positioning reproducibility of the robot typically used for industrial use is about 50 μm. Accordingly, the camera 04 requires a recognition accuracy of 50 μm or less.

A pivotal distance of 50 μm at a position apart from the axis of the pivotal joint by 100 mm corresponds to 521 pulses, which are counted as output pulses of an input encoder added to a motor for driving the links. Accordingly, if the camera 04 has a resolution of 50 μm, a position or orientation offset equivalent to 521 pulses counted as output pulses of the input encoder can be detected. Conventional alignment accuracy through use of an after-mentioned pin exceeds 1000 pulses, which are counted as output pulses of the input encoder. Accordingly, only use of the camera 04 can achieve an accuracy twice as high as the alignment accuracy through use of the pin. The calculation is made assuming that the reduction ratio of pivotal movement between the motor and the link is 50, and the pivotal angle for 50 μm with the link length of 100 mm is 0.5 mrad.

$$0.5 \times 50/2PI \times 10^{17} = 521$$

(Position or Orientation Offset Detection Control)

At any timing, e.g., at a time of daily inspection or occurrence of trouble, an operator operates an operation panel SP to execute a position or orientation offset detection mode, compares the current state of the robot 01 with an initial reference value of the robot 01, and grasps presence or absence of reduction in accuracy of the robot 01.

The controlling unit 08 controls the robot 01 and the camera 04. The controlling unit 08 performs feedforward control for motors provided for the respective joints of the robot 01 based on the outputs of rotary encoders added to the respective motors.

When an instruction for position or orientation offset detection control is issued, the controlling unit 08 performs trajectory acquiring control first, and a trajectory acquisition unit 05 acquires the trajectory of the moving mark 03. The trajectory acquiring control causes the robot 01 to take the initial position and orientation, and subsequently pivots the link 060 around the pivotal joints 021, 031 and 051 while the camera 04 photographs the mark 03. After photographing, photographed data through the camera 04 is processed to acquire the trajectory of the moving mark 03.

Next, the controlling unit 08 performs computational control, and a computation unit 06 identifies the joint whose accuracy is reduced. The computational control processes the trajectory of the moving mark 03 acquired by the trajectory acquiring control, calculates the rotation diameter and the rotation center position of the trajectory, and compares these diameter and position with the previous rotation diameter and the rotation center position of the trajectory with no origin offset.

Next, the controlling unit 08 performs display control, and the displaying unit 07 displays, on the monitor screen 09, the position and details of reduction in accuracy and necessary measures.

(Trajectory Acquiring Control)

Figure 2:
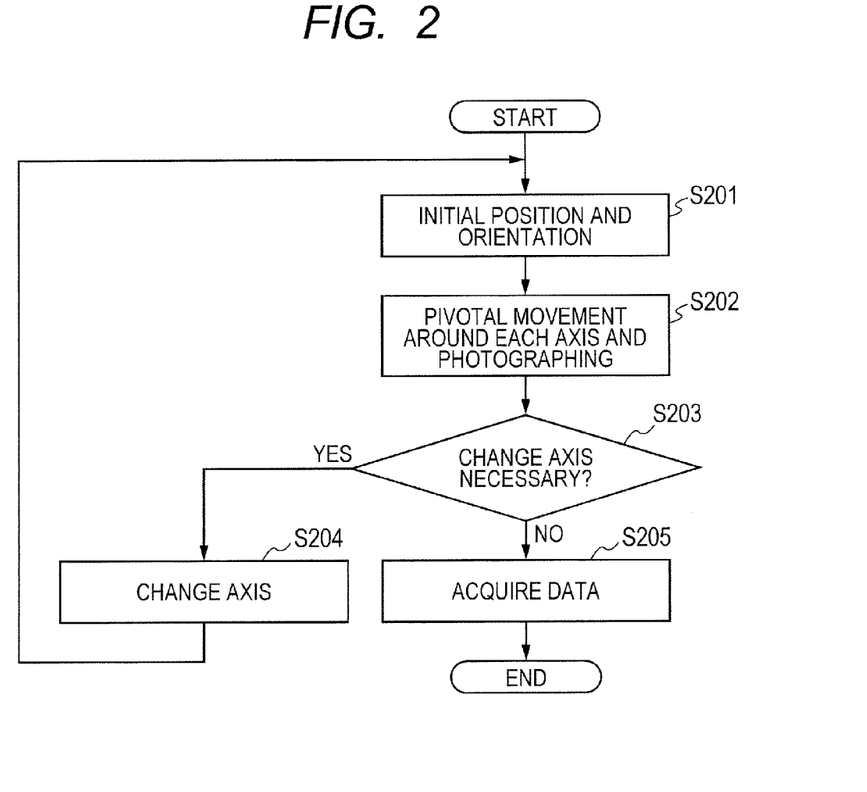
FIG. 2 is a flowchart of trajectory acquiring control.

FIG. 2 is a flowchart of the trajectory acquiring control.

As illustrated in FIG. 2, when an instruction for trajectory acquiring control is issued, the controlling unit 08 causes the robot 01 to take the initial position and orientation (S201). At the initial position and orientation, the pivotal joints 021, 031 and 051 of the robot 01 are aligned in parallel with the photographing direction by the camera 04, the motors are operated until the outputs of the encoders embedded in the pivotal joints 021, 031 and 051 indicate respective predetermined coordinate angles.

The controlling unit 08 integrally pivots the links 020 to 060 around the pivotal joint 021 from the initial position and orientation, and causes the camera 04 to photograph the mark 03 (S202). While the pivotal joints 031 and 051 are maintained at the initial positions and orientations, rotational movement is performed by the pivotal joint 021.

Since the axis is required to be changed (Yes in S203), the controlling unit 08 changes the target to the pivotal joint 031 (S204) and returns the position and orientation to the initial position and orientation (S201). The links 030 to 060 are integrally pivoted around the pivotal joint 031 from the initial position and orientation, and causes the camera 04 to photograph the mark 03 (S202). While the pivotal joints 021 and 051 are maintained at the initial positions and orientations, rotational movement is performed by the pivotal joint 031.

Since the axis is required to be changed (Yes in S203), the controlling unit 08 changes the target to the pivotal joint 051 (S204) and returns the position and orientation to the initial position and orientation (S201). The link 060 is pivoted around the pivotal joint 051 from the initial position and orientation and causes the camera 04 to photograph the mark 03 (S202). While the pivotal joints 021 and 031 are maintained at the initial positions and orientations, rotational movement is performed by the pivotal joint 051.

Such a photographing step is called movement around each axis. The movement around each axis is movement required to identify the pivotal joint whose accuracy is reduced. During movement around each axis, the camera 04 photographs the current trajectory of the mark 03 to acquire the current trajectory of the mark 03 in a state where rotational axis offsets may occur at the pivotal joints 021, 031 and 051 of the robot 01. The current trajectory is a reference value required to identify the pivotal joint whose accuracy is reduced, and acquired for each of the pivotal joints 021, 031 and 051.

The controlling unit 08 acquires the current trajectory based on the acquired photographed data, calculates and stores the current trajectory, the rotation center position and the rotation diameter of the mark 03 in a three-dimensional space based on the current trajectory, and uses the calculated data as data on the robot 01 in the current state (S205). More specifically, the rotation center position and the rotation diameter are geometrically calculated from three points on the acquired trajectory of the mark 03.

At the time of setting up the robot 01 and at the time after subsequent replacement of a component, the trajectory acquiring control is performed in an analogous manner. The reference trajectory of the mark 03 at the initial state where no rotational axis offset occurs at the pivotal joints 021, 031 and 051 of the robot 01 is acquired. The reference trajectory is a reference value required to identify the pivotal joint whose accuracy is reduced, and acquired for each of the pivotal joints 021, 031 and 051. The controlling unit 08 calculates and stores the trajectory, the rotation center position and the rotation diameter of the mark 03 in the initial state based on the reference trajectory in the initial state, and uses the calculated data as data in the initial state of the robot 01.

(Computational Control)

Figure 3:
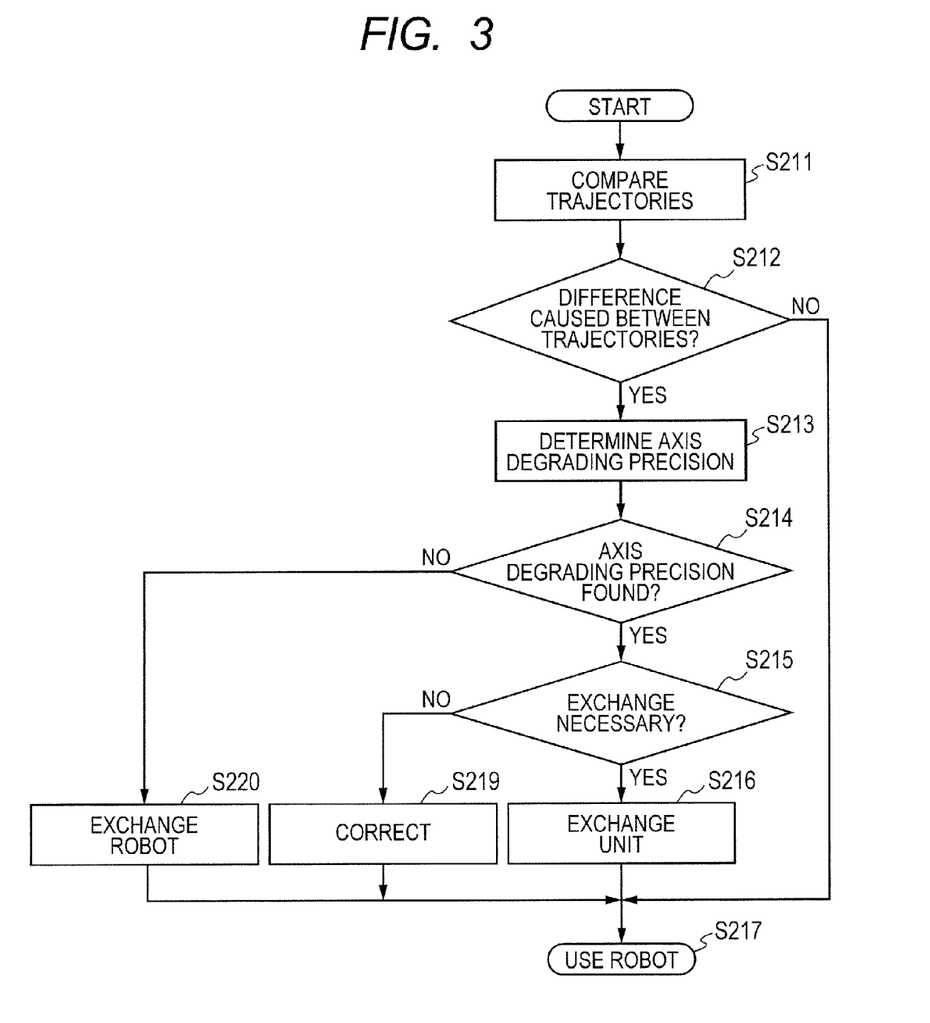
FIG. 3 is a flowchart of computational control.

FIG. 3 is a flowchart of the computational control.

As illustrated in FIG. 3 with reference to FIG. 1, the controlling unit 08 compares trajectories after the movement around each axis as described above (S211).

If the initial reference values coincide with the newly acquired current trajectory, rotation center and rotation diameter (No in S212), the controlling unit 08 determines that no pivotal joint fails, finishes the failure determination flow, and allows the robot 01 to be used (S217).

If the initial reference value does not coincide with any of the newly acquired current trajectory, rotation center and rotation diameter (Yes in S212), the controlling unit 08 performs determination of the axis with a reduced precision (S213). According to the determination of the axis with a reduced accuracy, the pivotal joint causing a rotational axis offset is identified using an after-mentioned preliminarily prepared table (Table 1) for determining the failure position.

If the pivotal joint causing the rotational axis offset cannot be identified (No in S214), the controlling unit 08 displays, on the monitor screen 09, an indication of robot replacement that indicates that the entire robot is to be replaced (S220). After the robot is replaced, the controlling unit 08 allows the robot 01 to be used (S217).

If the pivotal joint causing the rotational axis offset can be identified (Yes in S214), the controlling unit 08 determines whether to replace the link unit that includes the pivotal joint causing the rotational axis offset or not (S215).

If the controlling unit 08 determines that the link unit is required to be replaced (Yes in S215), the controlling unit 08 displays an indication of unit replacement of the link unit on the monitor screen 09 (S216). After the unit is replaced, the controlling unit 08 allows the robot 01 to be used (S217).

If the controlling unit 08 determines that the link unit is not required to be replaced (No in S215), the controlling unit 08 displays an indication of correcting the front end position of the robot 01 on the monitor screen 09 (S219). After the position is corrected, the controlling unit 08 allows the robot 01 to be used (S217).

As described above, the controlling unit 08 controls the robot 01 and the camera 04 to perform trajectory acquiring control, which is an example of the photographing step, and subsequently performs the computational control, which is an example of a joint identifying step. In the trajectory acquiring control, the photographing step is performed for each of the pivotal joints 021, 031 and 051, which is an example of at least two joints, to acquire photographed data. In the photographing step, the predetermined coordinate angles are assigned to multiple joints of the robot 01, respectively, the joints are caused to take the predetermined positions and orientations, and subsequently the mark 03 is photographed by the camera 04 in a process of causing the robot 01 to rotate from the predetermined position and orientation at one joint among the multiple joints. In the computational control, the joint causing a rotational axis offset is identified among the multiple joints of the robot based on the photographed data acquired by the trajectory acquiring control.

(Identification of Pivotal Joint)

FIGS. 4A to 4H are diagrams illustrating trajectory variation in the case where a pivotal joint causes a rotational axis offset.

As illustrated in FIG. 1, in the robot 01, the links 020, 030, 040 and 050 perform Y-axis rotation on a ZX-plane from the initial positions and orientations. Accordingly, in FIGS. 4A to 4H, the robot 01 is illustrated in a simplified manner as the link 020 pivoting around the pivotal joint 021, the link 030 (link 040) pivoting around the pivotal joint 031, and the link 050 (link 060, end effector 070) pivoting around the pivotal joint 051.

Figure 4A:
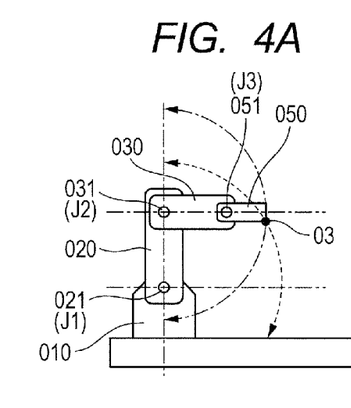
FIGS. 4A, 4B, 4C, 4D, 4E, 4F, 4G and 4H are diagrams illustrating trajectory variation in the cases of occurrence of rotational axis offsets at pivotal joints.

As illustrated in FIG. 4A, in the initial state, every pivotal joint causes no reduction in accuracy due to an angular offset. In the diagram, a dotted line indicates a trajectory drawn by the mark 03 during rotation around the pivotal joint 021. An alternate long and short dashed line indicates a trajectory drawn by the mark 03 during rotation around the pivotal joint 031.

As illustrated in FIGS. 4B to 4H, in case where any of the pivotal joints 021, 031 and 051 of the robot 01 fails, the positional relationship between links front and proximal to the joint shaft deviates, and the mark 03 draws a trajectory having a pattern of reduction in accuracy. The patterns are different from each other according to the failed joint axes.

Figure 4B:
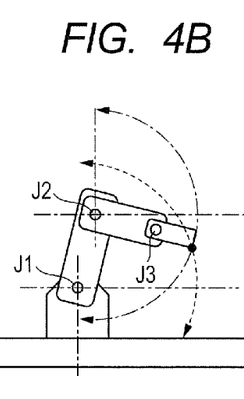

As illustrated in FIG. 4B, when the pivotal joint 021 causes a rotational axis offset, the current trajectory deviates from the trajectory in the initial state. At this time, with respect to the initial state, the diameter and the rotation center position of the trajectory where the mark 03 passes during rotation of the pivotal joint 021 are such that (diameter: coincidence) (rotation center position: coincidence). With respect to the initial state, the diameter and the rotation center position of the trajectory where the mark 03 passes during rotation of the pivotal joint 031 are such that (diameter: coincidence) (rotation center position: non-coincidence).

Figure 4C:
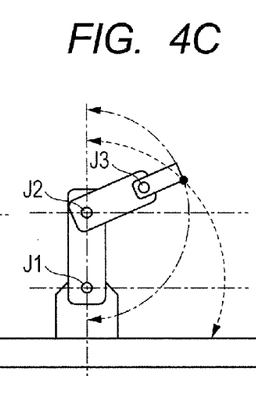

As illustrated in FIG. 4C, when the pivotal joint 031 causes a rotational axis offset, the current trajectory deviates from the trajectory in the initial state. At this time, with respect to the initial state, the diameter and the rotation center position of the trajectory where the mark 03 passes during rotation of the pivotal joint 021 are such that (diameter: non-coincidence) (rotation center position: coincidence). With respect to the initial state, the diameter and the rotation center position of the trajectory where the mark 03 passes during rotation of the pivotal joint 031 are such that (diameter: coincidence) (rotation center position: coincidence).

Figure 4D:
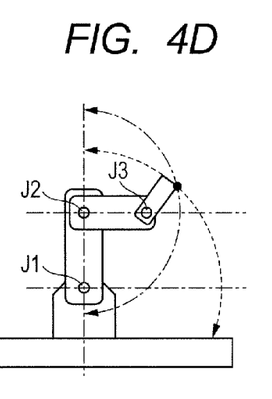

As illustrated in FIG. 4D, when the pivotal joint 051 causes a rotational axis offset, the current trajectory deviates from the trajectory in the initial state. At this time, with respect to the initial state, the diameter and the rotation center position of the trajectory where the mark 03 passes during rotation of the pivotal joint 021 are such that (diameter: non-coincidence) (rotation center position: coincidence). With respect to the initial state, the diameter and the rotation center position of the trajectory where the mark 03 passes during rotation of the pivotal joint 031 are such that (diameter: non-coincidence) (rotation center position: coincidence).

Figure 4E:
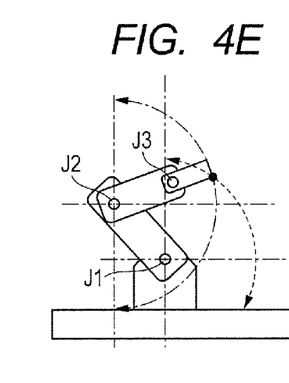

As illustrated in FIG. 4E, when the pivotal joints 021 and 031 cause rotational axis offsets, the current trajectory deviates from the trajectory in the initial state. At this time, with respect to the initial state, the diameter and the rotation center position of the trajectory where the mark 03 passes during rotation of the pivotal joint 021 are such that (diameter: non-coincidence) (rotation center position: coincidence). With respect to the initial state, the diameter and the rotation center position of the trajectory where the mark 03 passes during rotation of the pivotal joint 031 are such that (diameter: coincidence) (rotation center position: non-coincidence).

Figure 4F:
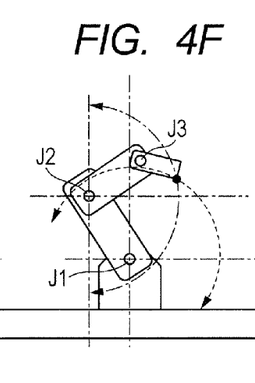

As illustrated in FIG. 4F, when the pivotal joints 021 and 051 cause rotational axis offsets, the current trajectory deviates from the trajectory in the initial state. At this time, with respect to the initial state, the diameter and the rotation center position of the trajectory where the mark 03 passes during rotation of the pivotal joint 021 are such that (diameter: non-coincidence) (rotation center position: coincidence). With respect to the initial state, the diameter and the rotation center position of the trajectory where the mark 03 passes during rotation of the pivotal joint 031 are such that (diameter: non-coincidence) (rotation center position: non-coincidence).

Figure 4G:
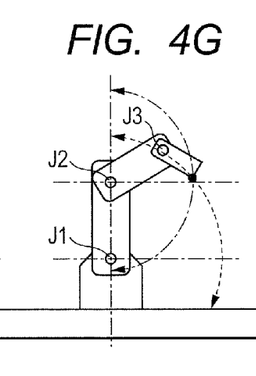

As illustrated in FIG. 4G, when the pivotal joints 031 and 051 cause rotational axis offsets, the current trajectory deviates from the trajectory in the initial state. At this time, with respect to the initial state, the diameter and the rotation center position of the trajectory where the mark 03 passes during rotation of the pivotal joint 021 are such that (diameter: non-coincidence) (rotation center position: coincidence). With respect to the initial state, the diameter and the rotation center position of the trajectory where the mark 03 passes during rotation of the pivotal joint 031 are such that (diameter: non-coincidence) (rotation center position: coincidence).

Figure 4H:
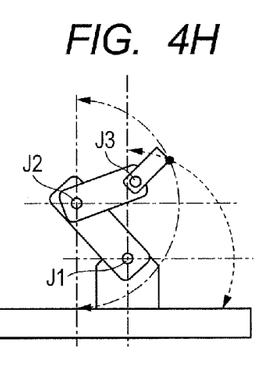

As illustrated in FIG. 4H, when the pivotal joints 021, 031 and 051 cause rotational axis offsets, the current trajectory deviates from the trajectory in the initial state. At this time, with respect to the initial state, the diameter and the rotation center position of the trajectory where the mark 03 passes during rotation of the pivotal joint 021 are such that (diameter: non-coincidence) (rotation center position: coincidence). With respect to the initial state, the diameter and the rotation center position of the trajectory where the mark 03 passes during rotation of the pivotal joint 031 are such that (diameter: non-coincidence) (rotation center position: non-coincidence).

Accordingly, the controlling unit 08 can identify the pivotal joint causing reduction in accuracy, with reference to Table 1, based on results of comparison of the respective trajectories of rotation around the pivotal joints 021, 031 and 051 with the respective trajectories in the initial state.

For instance, FIGS. 4D and 4G illustrate the case of rotating the pivotal joint 021 (diameter: non-coincidence) (rotation center position: coincidence) and the case of rotating the pivotal joint 031 (diameter: non-coincidence) (rotation center position: coincidence). These cases are identical to each other, and cannot be discriminated from each other. However, as listed in Table 1, rotation of the J3-shaft causes the case of FIG. 4D (diameter: coincidence) (rotation center position: coincidence) or the case of FIG. 4G (diameter: coincidence) (rotation center position: non-coincidence). Both cases can thus be discriminated from each other.

For instance, FIGS. 4F and 4H illustrate the cases where rotation of the pivotal joint 021 or rotation of the pivotal joint 031 sometimes causes the same trajectories, which cannot discriminate the cases from each other. That is, the case where the accuracies of the pivotal joints 021 and 051 are reduced cannot sometimes be discriminated from the case where the accuracies of all the shafts are reduced. However, as listed in the Table 1, difference between trajectories during rotation of the pivotal joint 051 can discriminate both cases from each other.

(Repair)

Figure 5A:
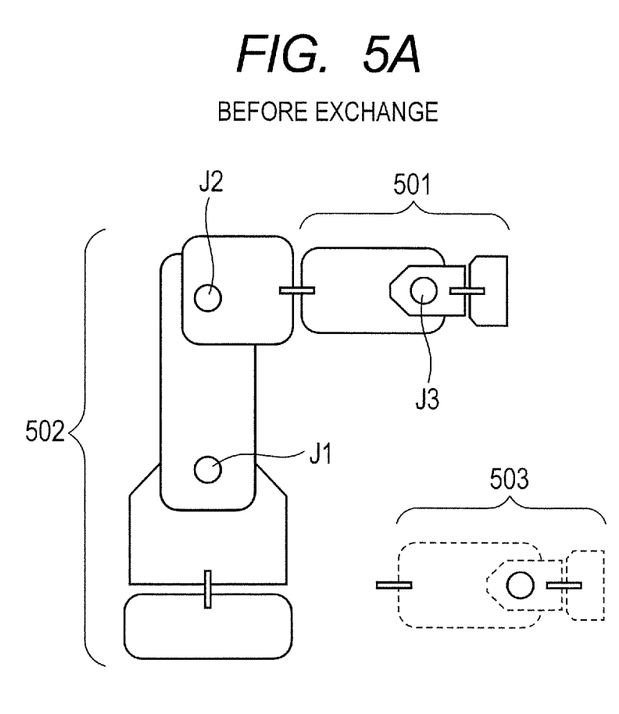
FIG. 5A is a diagram illustrating a state before replacement of a part of the robot.
Figure 5B:
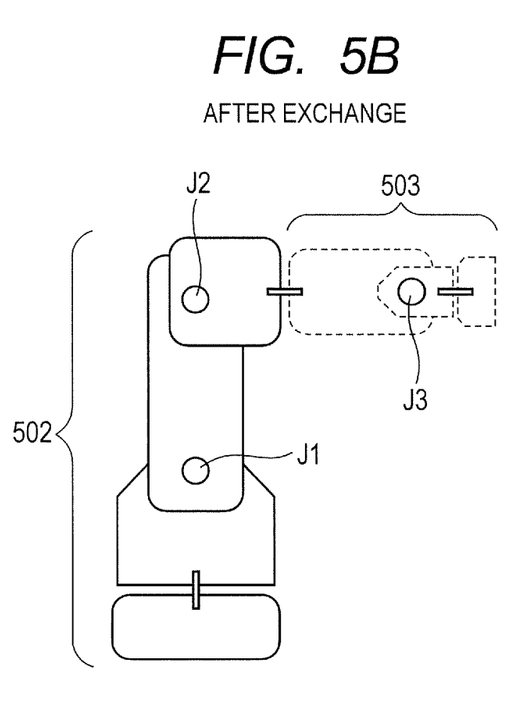
FIG. 5B is a diagram illustrating a state after replacement of the part of the robot.

FIGS. 5A and 5B are diagrams illustrating replacement of a part of the robot.

As illustrated in FIG. 3, in Embodiment 1, the recovery process after determination of the shaft having a reduced accuracy (S214) is divided into three processes, which are robot replacement (S220), correction (S219) and unit replacement (S216).

In the case of the robot replacement (S220), the robot 01 is taken out of the production line, and a preliminarily prepared, reserved robot 01 is attached. Typically, the robots 01 are different from each other owing to variation in component shape and variation in manufacturing accuracy. The position of the front end of the end effector 070 attached the robot 01 thus varies.

Accordingly, if the robot 01 is replaced, a teaching operation that teaches movement points to the robot 01 is performed again before starting operations on the production line, confirmation is made as to whether predetermined operations can be performed, and production is restarted. As

TABLE 1

| | J1-SHAFT ROTATION | | J2-SHAFT ROTATION | | J3-SHAFT ROTATION | | FAILED SHAFT DETERMINATION RESULT |
|---|---|---|---|---|---|---|---|
| | DIAMETER | CENTER POSITION | DIAMETER | CENTER POSITION | DIAMETER | CENTER POSITION | |
| a | — | — | — | — | — | — | |
| b | A | A | A | B | A | B | J1 |
| c | B | A | A | A | A | B | J2 |
| d | B | A | B | A | A | A | J3 |
| e | B | A | A | B | A | B | J1, J2 |
| f | B | A | B | B | A | B | J1, J3 |
| g | B | A | B | A | A | B | J2, J3 |
| h | B | A | B | B | A | B | J1, J2, J3 |

Table 1 is for determining which axis causes reduction in accuracy, based on the acquired trajectories illustrated in FIGS. 4B to 4H. In Table 1, the pivotal joint 021 is called a J1-shaft, and the link 020 is called a link J1. The pivotal joint 031 is called a J2-shaft, and the link 030 (and the link 040) is called a link J2. The pivotal joint 051 is called a J3-shaft, and the link 060 (and the end effector 070) is called a link J3. Table 1 describes the cases of coincidence with the initial state (a) as "A", while describing the cases of non-coincidence as "B".

described above, the reference trajectory of the mark 03 in the initial state where the pivotal joints 021, 031 and 051 of the robot 01 cause no rotational axis offset is acquired. The reference trajectory is a reference value required to identify the pivotal joint whose accuracy is reduced, and used as data in the initial state of the robot 01 as described above.

In the case of the correction (S219), the offset occurring at the position of the front end of the end effector 070 of the robot 01 is corrected, the teaching operation for allowing the predetermined operations is performed again, and then production is restarted.

In the case of the unit replacement (S216), only a part of the robot 01 is replaced as illustrated in FIG. 5B. In Embodiment 1, the robot 01 is designed to be easily disassembled and reassembled at each joint shaft in a design stage. Accordingly, only a part of the robot 01 can be easily replaced on a part-by-part basis in a state where the robot 01 is mounted on the production line, and production can be restarted without delay.

The design of the joint shafts of the multi joint robot without consideration of ease of being disassembled and repaired causes a problem of significant time consumption from identification of the joint shaft having a reduced accuracy to completion of repairing the multi joint robot as described above. Accordingly, as illustrated in FIG. 5A, the robot 01 is designed so as to be easily disassembled and reassembled at each joint shaft.

As illustrated in FIG. 5A, the robot 01 is designed such that the strength of the front end unit 501 has a lower allowance rate than that of a proximal unit 502 has. In case where the front end unit 501 of the robot 01 collides with a peripheral apparatus to reduce the accuracy, the front end unit 501 having a low allowance rate is destroyed first. Accordingly, adoption of the structure of allowing the front end unit 501 to be easily repaired can reduce a time for repair and recover in case of occurrence of reduction in accuracy of the robot 01. Furthermore, the reserved front end unit 503 is preliminarily prepared, thereby allowing the front end unit 501 to be replaced, which can complete repair of the robot without delay.

Comparative Example 1

In Comparative Example 1, pins are manually inserted into holes formed at the respective links that are front and proximal to the axes of the pivotal joint and the torsional joint. The offsets between the front and proximal links in the rotational directions are grasped based on the degrees of insertion of the pins, whereby the position with reduced accuracy is identified. This operation is manually performed by a skilled operator. Accordingly, there is a problem of time requirement ranging from several tens of minutes to several hours to determine the presence or absence of six-axis offsets in the six-axis multi joint robot.

On the contrary, in Embodiment 1, the position with reduced accuracy on the multi joint robot can be easily identified in a short time, as described above.

Comparative Example 2

In Comparative Example 2, as described in Japanese Patent Application Laid-Open No. S63-288696, a mark for camera recognition is added to a multi joint robot, and the current position and orientation of the multi joint robot is recognized based on a view of the mark from an external camera. The reduction in accuracy of the multi joint robot is detected by comparing the view of the mark from the external camera with a view of the mark estimated from an instruction value issued to the multi joint robot. However, in case of occurrence of abnormality at a proximal position of the multi joint robot, the abnormality also affects the axis of the front end. Accordingly, although the occurrence of abnormality as a whole can be recognized, a part causing abnormality cannot be identified. In this case, repair of the position where reduction in accuracy occurs requires identification of the position with reduced accuracy through another method. If the operation of Comparative Example 1 is performed to identify the position with reduced accuracy, there is a problem of time requirement ranging from several tens of minutes to several hours.

On the contrary, Embodiment 1 can not only detect the abnormality of the multi joint robot as a whole but also automatically and swiftly detect the part where abnormality occurs without taking the multi joint robot out of the production line, as described above.

Comparative Example 3

In Comparative Example 3, as described in Japanese Patent Application Laid-Open No. 2011-125976, when any instruction value is issued, marks added to a multi joint robot are recognized through an external camera. The presence or absence of abnormality is detected by comparing a view of the marks estimated from the instruction value with an actual view of the marks.

Comparative Example 3 determines the position and orientation of the multi joint robot based on the barycentric position and the view of the multiple marks. Accordingly, if the multi joint robot becomes dirty, the view of the mark from the camera is changed, which causes inconvenience for determining the position and orientation of the multi joint robot.

On the contrary, Embodiment 1 can highly accurately detect abnormality only if the mark 03 on the end effector 70 is clear even with the multi joint robot being dirty.

Comparative Example 4

Measures against the case of occurrence of partial reduction in accuracy in the multi joint robot can be considered as follows.

First, the multi joint robot is taken out of the production line, a new multi joint robot that is held as a reserve is attached to the production line, and the production process is restarted. However, preparation of the reserved multi joint robot requires additional cost, which is not desirable. Furthermore, if the entire multi joint robot is taken out of the production system and a reserved multi joint robot is newly attached, the procedures cause a large amount of temporal loss.

Second, a failure position is identified and repaired. However, the conventional method of identifying a failure position has a problem in that this method inspects irregularities of rotation by manually operating the joint units and in order to detect the rotational axis offsets of the joints, detects presence or absence of origin offsets by inserting origin pins. This method takes a significantly long time even by a skilled operator. Furthermore, the configuration of the joint units of the multi joint robot is complicated, which causes another problem of significant time requirement for a repairing operation after identification of the failure position.

On the contrary, the robot 01 of Embodiment 1 is designed to allow the multi joint robot to be partially replaced and repaired. Accordingly, the robot 01 can be easily disassembled and reassembled on a link-by-link basis. Therefore, only the part concerned can be repaired without taking the multi joint robot out of the production system. The temporal loss to restart of the production system is small.

Furthermore, the robot 01 of Embodiment 1 has the structure capable of being easily disassembled and reassembled at each joint shaft. Accordingly, the repairing operation can be swiftly performed with disassembling and reassembling at each joint shaft, thereby allowing the production line to be restarted without delay.

Advantageous Effects of Embodiment 1

In Embodiment 1, when any one axis of the multi joint robot is moved, the diameter and the rotation center position of the trajectory drawn by the marker added to the multi joint robot are compared with the diameter and position in a previous state, and "coincidence" or "non-coincidence" is determined. Based on the determination result and the preliminarily prepared determination table (Table 1) of the axis having a reduced accuracy, the axis where reduction in accuracy occurs is determined. Accordingly, in the multi joint robot, the operation of identifying the joint shaft where reduction in accuracy occurs can be automatically performed while the multi joint robot is mounted on the production line. Even with a small number of cameras, multiple moving trajectories are acquired, and presence or absence of the origin offsets of the individual joints can be highly accurately determined.

In Embodiment 1, through the typical movement of the multi joint robot on the production line, presence or absence of abnormality can be diagnosed. Accordingly, diagnosis can be performed without stopping the production line. The time for diagnosing reduction in accuracy of the multi joint robot is therefore reduced, which exerts advantageous effects of improving the efficiency of the production line.

In Embodiment 1, when the robot 01 takes the predetermined position and orientation, the controlling unit 08 adjusts the torsional angles of the torsional joints 011, 041 and 061, and aligns the rotational axes of the pivotal joints 021, 031 and 051 in parallel to each other, which is an arrangement including not only parallel but also skew. Accordingly, multiple moving trajectories similar to each other are photographed for each of the pivotal joints 021, 031 and 051 by the camera 04, thereby allowing the moving trajectories to be easily compared with each other.

In Embodiment 1, the mark 03 is photographed by the camera 04 in a direction parallel to the rotational axes of the pivotal joints 021, 031 and 051; the parallel is an arrangement including not only parallel but also skew. Accordingly, the moving trajectories can be approximated as arcs, thereby allowing the moving trajectories to be easily compared with each other.

In Embodiment 1, based on photographed data of the mark 03 acquired by the trajectory acquiring control, the moving trajectory of the mark 03 is acquired. In a state with no rotational axis offset at the pivotal joints 021, 031 and 051, the moving trajectory of the mark 03 in the initial state acquired by performing the trajectory acquiring control is compared with the moving trajectory of the mark 03 immediately before acquired by performing trajectory acquiring control. Accordingly, the rotational axis offset of each of the pivotal joints 021, 031 and 051 can be easily calculated as the difference between the moving trajectory in the initial state and the current moving trajectory.

Variation Example

For the sake of simplicity, in Embodiment 1, the method of determining the axis where accuracy is reduced among the axes of the pivotal joints 021, 031 and 051 that perform Y-axis rotation in view of the ZX-plane in FIG. 1 has been described.

The axis where reduction in accuracy occurs can be determined also for each of the torsional joint 011 that performs Z-axis rotation in FIG. 1 and the torsional joints 041 and 061 that perform X-axis rotation, according to an analogous method. That is, the axis where reduction in accuracy occurs can be identified based on the combination of abnormalities of the trajectories of the mark 03 during movement of each of the pivotal joints 021, 031 and 051 and the torsional joints 011, 041 and 061.

In Embodiment 1, the method of identifying the joint shaft where reduction in accuracy occurs for the three joint shafts that perform Y-axis rotation in the six-axis multi joint robot has been described. However, the present invention is not limited to the robot having this configuration. Alternatively, even with a robot having another configuration, adoption of a similar method can identify the joint shaft where reduction in accuracy occurs.

Furthermore, in Embodiment 1, the trajectory of the moving mark 03 is acquired, then the axis where reduction in accuracy occurs is identified, and the axis with a reduced accuracy is determined using the preliminarily prepared table. Alternatively, the link parameters (link length, distance between axes, and angle between links) of the robot are calculated from the trajectory of the mark 03 during movement of each axis, and compared with the link parameters in the initial state, thereby allowing axis where reduction in accuracy occurs to be identified.

In Embodiment 1, the position or orientation offset is a rotational axis offset defined as the difference between the coordinate angle set for the joint and the actual angle of the joint based on photographed data. The rotational axis offset of each of the pivotal joints 021, 031 and 051 is acquired as the difference between the moving trajectory in the initial state and the current moving trajectory. However, the position or orientation offset to be acquired is not limited to the rotational axis offset. Alternatively, the position or orientation offset may be any offset in the link parameters described above (link length, distance between axes, and angle between links). For instance, when the link parameter described above is acquired, the angle between links is detected. Accordingly, another offset in a direction other than the direction of the rotational axis offset can be also grasped.

The method of discriminating FIGS. 4F and 4H from each other adds marks 03 to the links 050 and 030, causes the camera 04 to photograph these marks to acquire the trajectories, which can discriminate both cases from each other.

As illustrated in FIG. 1, the computational control may acquire the starting point coordinates and the end point coordinates of the moving trajectory of the mark 03 from the photographed data of the mark 03 acquired by the trajectory acquiring control. The starting point coordinates and the end point coordinates of the moving trajectory of the mark 03 acquired in the case with no rotational axis offset at the pivotal joints 021, 031 and 051 may be compared with the starting point coordinates and the end point coordinates of the moving trajectory of the mark 03 acquired immediately before the joint identifying step.

Effect of the Present Invention

The controlling method of a robot system of the present invention can capture the movement range of the mark in the photographing step performed for at least two joints within the angle of view of one camera. Accordingly, only with this camera, high resolution information on the origin offsets at each of the individual joints can be acquired. Therefore, even with a small number of cameras, presence or absence of an origin offset at each of individual joints can be highly accurately determined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-072423, filed Mar. 31, 2014, which is hereby incorporated by reference herein in its entirety.

What is claimed is:

1. A robot system comprising:
   a multi joint robot having an end effector or a portion of a distal link, wherein the end effector or the portion of a distal link has a mark;
   a camera configured for photographing the mark; and
   a controlling unit configured to control the multi joint robot and the camera, wherein,
   the controlling unit is configured to photograph, during a pivotal movement of one of a plurality of joints of the multi joint robot from a predetermined position and orientation, the mark using the camera in order to acquire first photographed data, and to photograph, during a pivotal movement of another of the plurality of joints from the predetermined position and orientation, the mark using the camera in order to acquire second photographed data, and
   wherein the controlling unit is further configured to identify a joint causing position or orientation offset among the one of the plurality of joints and the other of the plurality of joints of the multi joint robot based on the first and second photographed data.

2. The robot system according to claim 1, wherein the multi joint robot can be disassembled at each of the joints and is exchangeable per each of a plurality of link units.

3. The robot system according to claim 1, further comprising a display unit configured to display a joint identified as causing a position or orientation offset.

* * * * *